Jan. 16, 1951 L. S. WILLIAMS 2,537,947
INDICATOR DRIVE FOR WEIGHING SCALES
Filed May 20, 1947 2 Sheets-Sheet 1
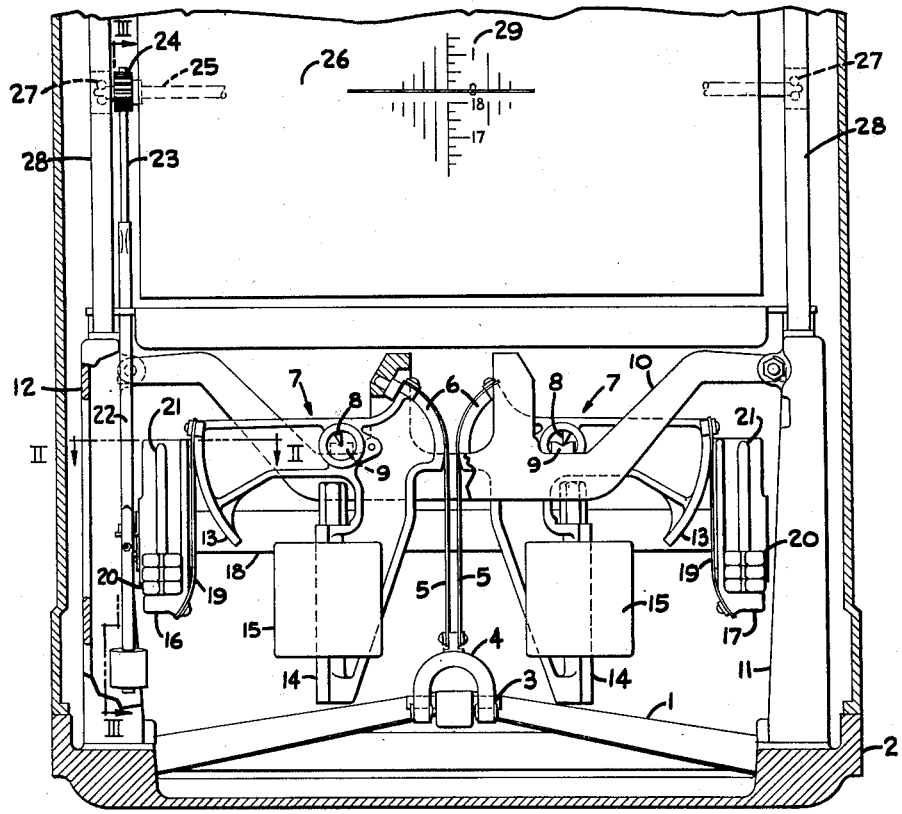
Fig. I
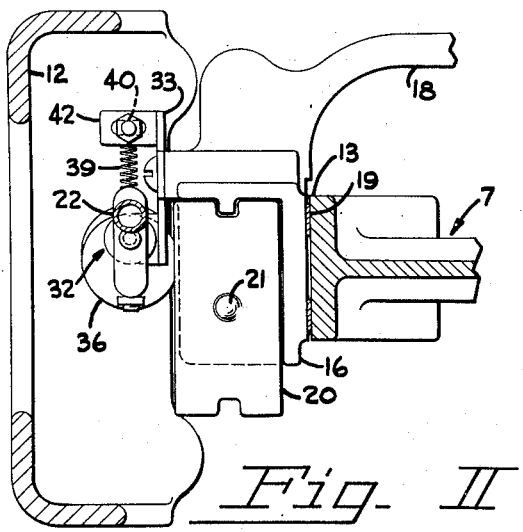
Fig. II
INVENTOR.
Lawrence S. Williams
BY
Marshall and Marshall
ATTORNEYS Jan. 16, 1951  L. S. WILLIAMS  2,537,947
INDICATOR DRIVE FOR WEIGHING SCALES
Filed May 20, 1947  2 Sheets-Sheet 2
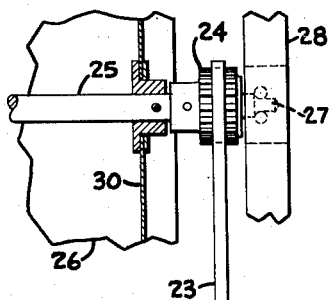
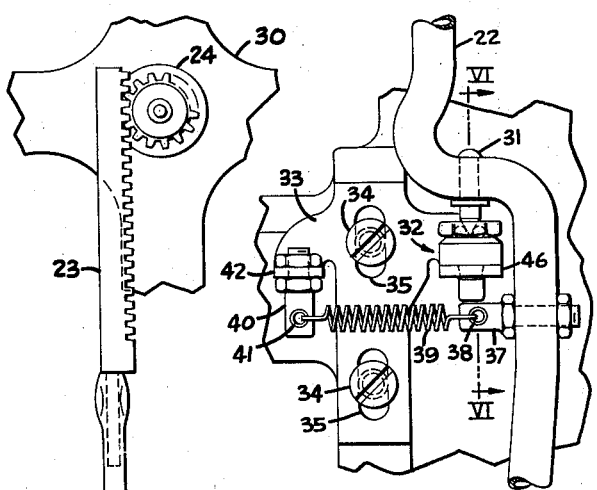
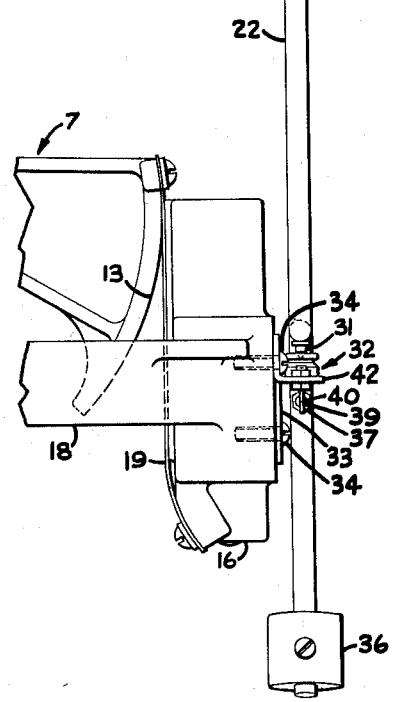
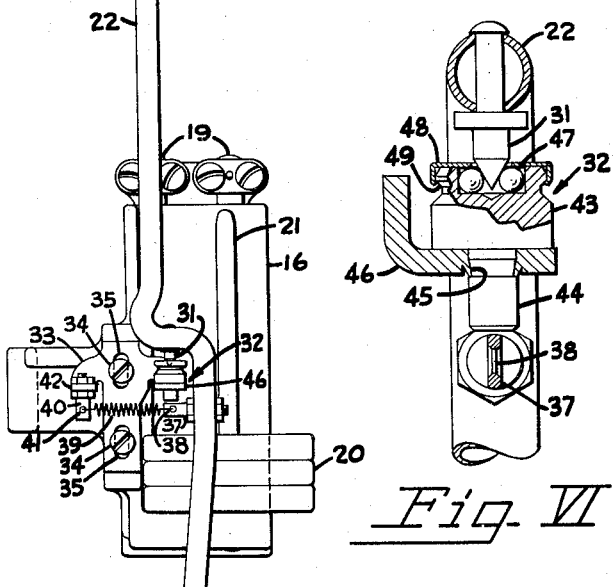
Fig. V
Fig. VI
Fig. IV    Fig. III
INVENTOR.
Lawrence S. Williams
BY
Marshall and Marshall
ATTORNEYS Patented Jan. 16, 1951

2,537,947

UNITED STATES PATENT OFFICE 2,537,947

INDICATOR DRIVE FOR WEIGHING SCALES

Lawrence S. Williams, Toledo, Ohio, assignor to Toledo Scale Company, Toledo, Ohio, a corporation of New Jersey Application May 20, 1947, Serial No. 749,231

7 Claims. (Cl. 74—422)

1

This invention relates to weighing scales and in particular to mechanism employed for driving a weighing scale indicator according to the movement of the load counterbalancing mechanism.

One source of friction that prevents exact indication of load in a weighing scale is the friction acting between the intermeshing teeth of a rack and a pinion that are used to drive an indicator or an indicating chart according to the load being counterbalanced. Slight misalignment of the rack with respect to the pinion cooperating therewith causes a substantial increase in the amount of the friction introduced in this portion of the weighing scale mechanism. The misalignment may result from inaccuracy in manufacture or adjustment or in deflection of the parts as the weighing scale is tipped out of level. It is generally impossible to impose sufficient restraint on the rack to maintain it in precise alignment.

The principal object of this invention is to provide a rack support that permits the rack to swivel about a longitudinal axis so that it may at all times align itself with the cooperating pinion.

Another object of the invention is to balance the rack about its point of support so that its position is not affected by the force of gravity.

Another object of the invention is to provide a resilient force that holds the rack in mesh with the pinion but which does not contribute any force tending to rotate the rack about its longitudinal axis.

These and other objects and advantages are attained by mounting the rack assembly at its center of gravity on a bearing that permits free rotation about the longitudinal axis of the rack and by providing a spring for urging the rack into mesh with the pinion.

A preferred embodiment of the invention is illustrated in the accompanying drawings.

In the drawings:

Figure I is an elevation of a weighing scale with the housing removed to show the load counterbalancing mechanism and the drive between the mechanism and the load indicating chart.

Figure II is a fragmentary horizontal section, at an enlarged scale, taken substantially along the line II—II of Figure I.

Figure III is a fragmentary elevation as seen from the line III—III of Figure I.

Figure IV is an elevation of the rack assembly and cooperating parts as seen from the front of the weighing scale.

Figure V is an enlarged fragmentary detail of the rack mounting assembly.

2

Figure VI is a section through the rack supporting bearing taken along the line VI—VI of Figure V.

These specific figures and the accompanying description are intended merely to illustrate the invention and are not intended to impose limitations on the claims.

A weighing scale of the type suitable for use in retail food stores is illustrated in the drawings. In this scale the force from loads to be weighed is transmitted from a load receiver and a spider (not shown) to a lever 1 that is fulcrumed in a base 2. The lever 1 is provided with a power pivot 3 that cooperates with bearings in a stirrup 4 to transmit load forces to a pair of power ribbons 5 that overlie and are attached to the upper ends of power sectors 6 of a pair of load counterbalancing pendulums 7. The load counterbalancing pendulums are provided with knife edges 8 that rest in V-bearings 9 mounted in an underslung portion of a bridge 10 that extends between the upper ends of a pair of uprights 11 and 12 erected from the base 2. In addition to the power sectors 6, which are eccentric with respect to the turning axes of the pendulums as defined by the knife edges 8, each pendulum is provided with a second sector 13 that is concentric with respect to the turning axis of the pendulum. A straight track 14 is also provided on each pendulum to receive a capacity adjusting weight 15.

A loading frame comprising a pair of weight receptacles 16 and 17 connected by a crossbar 18 is suspended from the pendulums 7 by means of thin flexible ribbons 19 that overlie and are attached to the upper ends of the concentric sectors 13. Slugs 20 cast of lead or other heavy material are stacked on pins 21 of the weight receptacles 16 and 17, a sufficient number of slugs being used to bring the weight of the slugs and receptacles to a prescribed value as required in the adjustment of the weighing scale. The eccentricity of the power sectors 6, the location of the center of gravity of the pendulum bodies 7 including the weights 15 and the load applied by the loaded weight receptacles 16 and 17 are selected so that the pendulum bodies 7 rotate through increments of angle that are exactly proportional to the increments of load placed on the load receiver of the scale. Since the weight receptacles 16 and 17 are supported by ribbons overlying concentric sectors of the pendulums the weight receptacles are raised through increments of distance that are exactly proportional to the increments of load applied to the load receiver.

The upward movement of the weight receptacle 16 is transmitted through a rack rod 22 that at its upper end carries a rack 23 meshing with a pinion 24 mounted on an indicator shaft 25 that carries an indicia-bearing cylindrical chart 26. The rack 23 is backed up by a small roller (not shown) that, while not normally contacting the rack, prevents the rack 23 from getting out of mesh with the pinion 24. The indicator shaft 25 is journaled in ball bearings 27 that are mounted in standards 28 erected from the uprights 11 and 12. The cylindrical chart 26 may be of the conventional computing type which, in addition to weight indicia 29, may include computed value indicia arranged in columns and selected in accordance with a price bar mounted adjacent the chart. The cylindrical portion of the chart 26 is supported from the shaft 25 by means of spiders 30 that are arranged at intervals along the length of the shaft 25 and the chart 26.

Referring to Figures III, IV and V, the rack rod 22, consisting of a formed length of steel tubing, is provided with a conical downwardly-directed pivot 31 that rests in a bearing 32 mounted in a formed sheet metal stamping 33 that is secured to the weight receptacle 16 by screws 34 passing through slots 35 in the stamping and threaded into the wall of the weight receptacle 16. The slots 35 permit the stamping to be adjusted vertically as may be required in the adjustment of the weighing scale. A balance weight 36 mounted on the lower end of the rack rod 22 is secured in a position such that the center of gravity of the rack rod 22 including the rack 23 and the balance weight 36 is located near or at the conical pivot 31. Since the center of gravity of the rack assembly is located near or at its point of support there is little or no gravitation force tending to hold the rack in mesh with the pinion 24. To supply this force the rack rod 22 in the region beneath the pivot 31 is provided with a fitting 37 having a hole 38 in which one end of a helical tension spring 39 is hooked. A second fitting 40, similar to the fitting 37 and having an opening 41, is mounted from an ear 42 of the stamping 33 in position to receive and hold the other end of the helical spring 39. The fitting 37 is located so that the point of contact between it and the end of the helical spring 39 is precisely in line with the conical pivot 31 and the longitudinal center line of the rack 23. As long as the point of force application of the spring 39 is on such a line through the pivot and, the spring 39 is merely hooked into the fitting 37, the spring does not interfere with free rotation of the rack rod assembly about its longitudinal axis.

Referring to Figures V and VI, the bearing 32 consists of a cup-shaped receptacle 43 having a downwardly extending tenon 44 that is inserted through a hole 45 in a second ear 46 of the stamping 33 and that is staked in position by deforming a portion of the stamping to drive it into a groove cut in the tenon 44. The cup portion of the receptacle 43 provides a cylindrical cavity to receive a plurality of bearing balls 47 that cooperate with the conical pivot to provide a combination radial-thrust ball bearing. A perforated cap 48 slipped over the upper end of the cup-shaped receptacle 43 and secured by clipping it over an annular land 49 serves to maintain the balls in position and to exclude particles of dust or dirt.

A small amount of clearance is left beneath the lower surface of the tenon 44 and the upper edge of the fitting 37 so that there is no possibility of lifting the conical pivot 31 out of engagement with the bearing balls 47 during sudden changes in load. Nevertheless, the rack rod 22 may be removed or installed by removing it and the stamping 33 as an assembly and then rotating the stamping 33 with respect to the rack rod 22 until the fitting 37 may be brought up along side the tenon 44.

In this assembly the spring 39 constitutes a resilient means for urging the rack into engagement with the pinion as is required when the center of gravity of the rack rod including the rack and the balancing weight is located at the point of support, i. e., when the rack rod assembly is balanced to neutral equilibrium. The advantages afforded by providing free rotation of the rack and rack rod assembly about its longitudinal axis is that under all conditions of operation the rack and pinion are in engagement across the full width of the rack teeth. This means that there are no small high pressure areas existing between these members to cause friction and binding of the rack teeth in the pinion. Furthermore, by balancing the rack and rack rod assembly on its point of pivotal support the assembly is made immune to tipping of the scale. In this assembly the pressure between the rack and the pinion remains substantially constant for all loads and may be kept up to appreciable values without introducing excessive friction.

Various modifications in the rack pivotal support may be made without departing from the spirit and scope of the invention.

Having described the invention, I claim:

1. In a weighing scale employing a rack and pinion to drive an indicator, in combination, a rack and rack rod assembly, a bearing carried by weighing mechanism, a pivotal connection for supporting the rack and rack rod assembly from the bearing, said rack and rack rod assembly having a first portion including the rack extending upwardly from the pivotal connection and a second portion extending downwardly to balance the first portion, and means for producing a moment that is substantially independent of the condition of level of the weighing scale for urging the rack into engagement with the pinion.

2. In a weighing scale employing a rack and pinion to drive an indicator, in combination, a rack and rack rod assembly that is pivotally supported from weighing mechanism and that is divided into two parts of generally equal moment one part of which includes the rack and the other of which extends in an opposite direction to balance the first part, and resilient means for urging the rack into engagement with the pinion.

3. In a weighing scale employing a rack and pinion to drive an indicator, in combination, a rack and rack rod assembly, a cone pivot for the rack rod, the pivot being located at a point dividing the rack and rack rod assembly into two parts of generally equal moment with respect to the pivot, a bearing carried by weighing mechanism for receiving the cone pivot, and a tension spring that is connected between mechanism carrying the bearing and a point on the rack rod that is on a line including the center line of the rack and the cone pivot for urging the rack into engagement with the pinion.

4. In a weighing scale employing a rack and pinion to drive an indicator, in combination, a rack and rack rod assembly having a first part including the rack and a second part serving as a counterbalance, a cone pivot and bearing for supporting the rack rod, the cone pivot and bearing being attached to weighing mechanism and to the rack rod assembly at a point between said first and second parts thereof, and means for applying a moment to the rack rod to urge the rack into engagement with the pinion.

5. In a weighing scale employing a rack and pinion to drive an indicating mechanism, in combination, a rack and rack rod assembly, a member carried by weighing mechanism, a pivotal connection between the member and the assembly, said connection accommodating limited rotation between the member and the assembly about any axis, said rack and rack rod assembly being divided into parts extending to each side of the pivotal connection such that the composite center of gravity of the rack and rack rod assembly generally coincides with the pivotal connection, and resilient means engaging the rack rod assembly on the line passed through the pivotal connection and the meshing teeth of the rack and pinion for urging the rack against the pinion.

6. In a weighing scale employing a rack and pinion to drive an indicating mechanism, in combination, a rack and rack rod assembly, a member carried by weighing mechanism, a universal pivotal connection between the assembly and the member, a counterweight on the assembly for locating the center of gravity of the assembly at the pivotal connection, said rack being oriented with an extension of its pitch line passing through the pivotal connection, and resilient means pivotally engaging the assembly on an extension of said pitch line of the rack whereby rotation of the rack on its longitudinal axis is controlled by its contact with the pinion and the pressure of the rack against the pinion is controlled by said resilient means.

7. In a weighing scale employing a rack and pinion to drive an indicating mechanism, in combination, a rack and rack rod assembly, a member that is moved vertically by weighing mechanism, a bearing in said member, a pivot in the rack and rack rod assembly, said pivot cooperating with the upper side of the bearing to support the rack rod assembly and permit rocking and swiveling movement of the assembly, a counterweight included in the assembly and located such that the center of gravity of the assembly is substantially at the pivot, a fitting included in the rack rod assembly and juxtaposed to the lower side of the bearing, and resilient means attached to the vertically movable member and engaging the fitting at a point located on a line passing through the pivot and the meshing teeth of the rack and pinion, whereby the rack is urged against the pinion and aligned by its contact with the pinion.

LAWRENCE S. WILLIAMS.

REFERENCES CITED

The following references are of record in the file of this patent:

UNITED STATES PATENTS

| Number | Name | Date |
|---|---|---|
| 1,246,321 | Rennerfelt | Nov. 13, 1917 |
| 1,249,262 | Weber | Dec. 4, 1917 |
| 1,249,633 | Dieter | Feb. 18, 1919 |
| 1,783,826 | Burke | Dec. 2, 1930 |